US011102268B2

(12) United States Patent
Nakajima et al.

(10) Patent No.: US 11,102,268 B2
(45) Date of Patent: Aug. 24, 2021

(54) RTP MONITORING DEVICE AND RTP MONITORING METHOD

(71) Applicant: Nippon Telegraph and Telephone Corporation, Tokyo (JP)

(72) Inventors: Takeaki Nakajima, Tokyo (JP); Koji Tanida, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/048,883

(22) PCT Filed: Apr. 19, 2019

(86) PCT No.: PCT/JP2019/016821
§ 371 (c)(1),
(2) Date: Oct. 19, 2020

(87) PCT Pub. No.: WO2019/208433
PCT Pub. Date: Oct. 31, 2019

(65) Prior Publication Data
US 2021/0168189 A1 Jun. 3, 2021

(30) Foreign Application Priority Data
Apr. 24, 2018 (JP) .............................. JP2018-082816

(51) Int. Cl.
*H04L 29/06* (2006.01)
*H04L 29/08* (2006.01)
*H04L 12/26* (2006.01)

(52) U.S. Cl.
CPC .......... *H04L 65/608* (2013.01); *H04L 43/106* (2013.01); *H04L 43/18* (2013.01); *H04L 65/1083* (2013.01); *H04L 67/303* (2013.01)

(58) Field of Classification Search
None
See application file for complete search history.

(56) References Cited

U.S. PATENT DOCUMENTS 4,675,897 A * 6/1987 Hashimoto ........... H04M 1/654
379/80
6,115,776 A * 9/2000 Reid ................. H04L 12/40032
709/230

(Continued)

FOREIGN PATENT DOCUMENTS

JP 2003124967 A * 4/2003
JP 2015226141 A * 12/2015

OTHER PUBLICATIONS

[No Author Listed], "3rd Generation Partnership Project; Technical Specification Group Core Network and Terminals; Inter-IMS Network to Network Interface (NNI) (Release 15)," 3GPP Global Initiative, 3GPP, TS 29.165, Dec. 2017, 147 pages.

(Continued)

*Primary Examiner* — Younes Naji
(74) *Attorney, Agent, or Firm* — Fish & Richardson P.C.

(57) ABSTRACT

An RTP disconnection detection function is operated properly even when networks having different timer values are connected. A first monitoring timer 11 configured to count a first timer value representing a predetermined time from when a callee transmission packet transmitted from a callee terminal 6 is interrupted, a second monitoring timer 12 configured to count a second timer value representing a predetermined time from when a caller transmission packet transmitted from a caller terminal 1 is interrupted, a first relay interpolation unit 14 configured to relay the callee transmission packet to the caller terminal 1, and while the first monitoring timer 11 times out and the second monitoring timer 12 performs counting, generate a callee interpolation packet for interpolating the callee transmission packet and transmit the generated callee interpolation packet to the caller terminal 1, and a second relay interpolation unit 15 configured to relay the caller transmission packet to the callee terminal 6, and while the second monitoring timer 12 times out and the first monitoring timer 11 performs counting, generate a caller interpolation packet for interpolating the caller transmission packet and transmit the generated (Continued)

caller interpolation packet to the callee terminal 6, are included.

6 Claims, 5 Drawing Sheets

(56) References Cited

U.S. PATENT DOCUMENTS

| | | | | |
|---|---|---|---|---|
| 7,953,841 | B2* | 5/2011 | Bennett | H04M 3/2281 |
| | | | | 709/224 |
| 2009/0303942 | A1* | 12/2009 | Camilleri | H04W 8/082 |
| | | | | 370/329 |
| 2016/0261502 | A1* | 9/2016 | Donovan | H04L 63/1458 |
| 2016/0373585 | A1* | 12/2016 | Sharma | H04W 76/25 |

OTHER PUBLICATIONS

[No Author Listed], "3rd Generation Partnership Project; Technical Specification Group Core Network and Terminals; IP Multimedia Subsystem (IMS) Application Level Gateway (IMS-ALG)—IMS Access Gateway (IMS-AGW) interface: Procedures descriptions (Release 14)," 3GPP Global Initiative, 3GPP, TS 23.334, Dec. 2017, 207 pages.

[No Author Listed], "Common interconnection interface between IMS operator's networks," The Telecommunication Technology Committee, Sep. 11, 2015, JJ-90.30, 20 pages.

Rosenberg et al., "SIP: Session Initiation Protocol," Network Working Group, IETF, RFC3261, Jun. 2002, 270 pages.

* cited by examiner

```
Session Initiation Protocol (INVITE)
    Request-Line: INVITE sip:17000000000 @172.16.51.1 SIP/2.0
    Message Header
        Via: SIP/2.0/TCP172.16.50.1;branch=z9hG4bKO11A63278751a5
        From: <sip:16000000000@172.16.50.1>;tag=1C052211
        To: <sip:17000000000@172.16.51.1>
        Call-ID: 4544754d2eaa8d4f1@172.16.50.1
        CSeq: 1 INVITE
        Contact: <sip:16000000000@172.16.50.1;transport=tcp>
        Max-Forwards: 70
        Content-Length: 243
        Content-Type: application/sdp
        Media-Inactivity-Timer:30
```

Fig. 5

RTP MONITORING DEVICE AND RTP MONITORING METHOD

CROSS-REFERENCE TO RELATED APPLICATIONS

This application is a National Stage application under 35 U.S.C. § 371 of International Application No. PCT/JP2019/016821, having an International Filing Date of Apr. 19, 2019, which claims priority to Japanese Application Serial No. 2018-082816, filed on Apr. 24, 2018. The disclosure of the prior application is considered part of the disclosure of this application, and is incorporated in its entirety into this application.

TECHNICAL FIELD

The present disclosure relates to an RTP monitoring apparatus and an RTP monitoring method for connecting a packet transfer network that transfers data using a Real-time Transport Protocol (RTP).

BACKGROUND ART

An operation provider operating a packet transfer network monitors a circulation status of voice and video packets (RTP packets) for each line from the viewpoint of securing communication quality and preventing erroneous billing, and may disconnect the corresponding line when detecting that the RTP packet is not circulating for a certain period of time. This function of disconnecting the line is hereinafter referred to as an RTP disconnection detection function. The disconnection of the line is performed based on the standards described in Non-Patent Literature 1 to 4.

CITATION LIST

Non Patent Literature

Non-Patent Literature 1: TTC, JJ-90.30 "Interconnection Common Interface between IMS Operator Networks"
Non-Patent Literature 2: 3GPP, TS 29.165 "Inter-IMS Network to Network Interface (NNI)"
Non-Patent Literature 3: IETF, RFC3261 "SIP: Session Initiation Protocol"
Non-Patent Literature 4: 3GPP 23.334 "IP Multimedia Subsystem (IMS) Application Level Gateway (IMS-ALG)-IMS Access Gateway (IMS-AGW) interface: Procedures descriptions"

SUMMARY OF THE INVENTION

Technical Problem

The RTP disconnection detection function monitors the time during which the RTP packet does not circulate using a timer, and acts to disconnect the line when the time during which the RTP packet does not circulate exceeds the timer time. A timer value for setting the timer time that determines the time until the line is disconnected is set according to the network policy based on the reliability of the network and may be different for each network.

When networks having different timer values are interconnected, the line is disconnected according to a short timer value. As a result, in a network having a long timer value, there is a problem in that the function of disconnecting a line does not operate properly.

The present disclosure has been made in view of this problem, and an object of the present disclosure is to provide an RTP monitoring apparatus and an RTP monitoring method that allow an RTP disconnection detection function to operate properly even when networks having different timer values are interconnected.

Means for Solving the Problem

According to an aspect of the present disclosure, an RTP monitoring apparatus for connecting a packet transfer network is provided, the RTP monitoring apparatus including: a first monitoring timer configured to count a first timer value representing a predetermined time from when a callee transmission packet transmitted from a callee terminal is interrupted; a second monitoring timer configured to count a second timer value representing a predetermined time from when a caller transmission packet transmitted from a caller terminal is interrupted; a first relay interpolation unit configured to relay the callee transmission packet to the caller terminal, and while the first monitoring timer times out and the second monitoring timer performs counting, generate a callee interpolation packet for interpolating the callee transmission packet and transmit the callee interpolation packet generated to the caller terminal; and a second relay interpolation unit configured to relay the caller transmission packet to the callee terminal, and while the second monitoring timer times out and the first monitoring timer performs counting, generate a caller interpolation packet for interpolating the caller transmission packet and transmit the caller interpolation packet generated to the callee terminal.

According to another aspect of the present disclosure, an RTP monitoring method executed by an RTP monitoring apparatus is provided, the RTP monitoring method including: counting a first timer value representing a predetermined time from when a callee transmission packet transmitted from a callee terminal is interrupted; counting a second timer value representing a predetermined time from when a caller transmission packet transmitted from a caller terminal is interrupted; relaying the callee transmission packet to the caller terminal, and while counting of the first timer value ends and the second timer value is counted, generating a callee interpolation packet for interpolating the callee transmission packet and transmitting the callee interpolation packet generated to the caller terminal; and relaying the caller transmission packet to the callee terminal, and while counting of the second timer value ends and the first timer value is counted, generating a caller interpolation packet for interpolating the caller transmission packet and transmitting the caller interpolation packet generated to the callee terminal.

Effects of the Invention

According to the present disclosure, an RTP disconnection detection function can be appropriately operated even when networks having different timer values are connected.

BRIEF DESCRIPTION OF DRAWINGS

FIG. 5 is a diagram illustrating a specific example of an SIP INVITE message.

DESCRIPTION OF EMBODIMENTS

Figure 1:
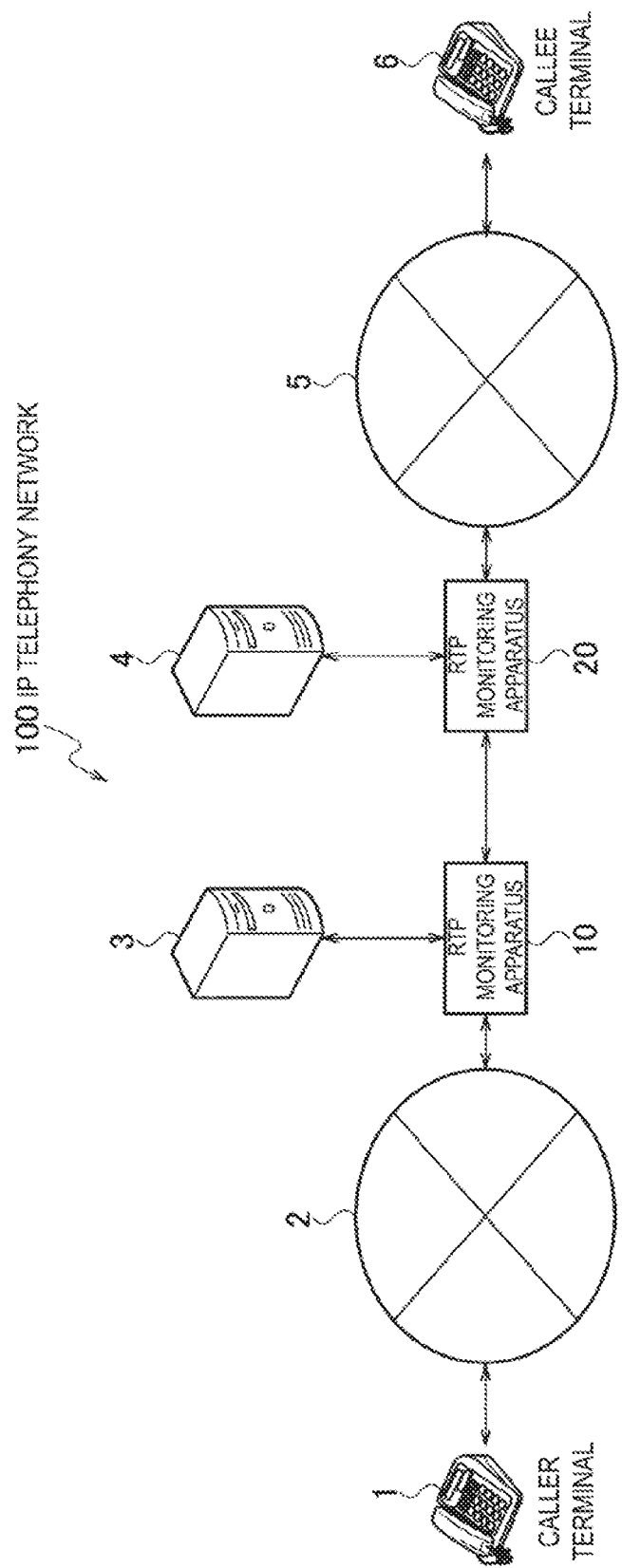
FIG. 1 is a block diagram illustrating a configuration example of an IP telephony network using an RTP monitoring apparatus according to an embodiment of the present disclosure.

Embodiments of the present invention will be described below with reference to the drawings. The same components in the plurality of drawings have the same reference characters allotted, and description of the same components will not be repeated.

IP Telephony Network

FIG. 1 is a block diagram illustrating a configuration example of an IP telephony network using an RTP monitoring apparatus according to an embodiment of the present disclosure. The IP telephony network 100 illustrated in FIG. 1 is a network that provides a telephony service using Voice over Internet Protocol (VoIP) technology. The IP telephony network 100 is a network using Session Initiation Protocol (SIP) as a path control protocol, and main information (data) communicated between terminals connected to the network is transmitted using Realtime Transport Protocol (RTP).

The IP telephony network 100 illustrated in FIG. 1 includes a caller terminal 1, a packet transfer network 2, an RTP monitoring apparatus 10, an SIP server 3, an SIP server 4, an RTP monitoring apparatus 20, a packet transfer network 5, and a callee terminal 6. An example in which operation providers are different such that the packet transfer network 2 is operated by, for example, company A and the packet transfer network 5 is operated by, for example, company B, is illustrated.

The policies may differ between the operation providers operating the network. For example, when the fact that the RTP packet is not circulated is detected, the time (timer value) for operating the RTP disconnection detection function for disconnecting the corresponding line may be different.

The SIP servers 3 and 4 are servers that perform management control of the IP telephony service using the SIP, and are provided in the packet transfer networks 2 and 5, respectively.

The RTP monitoring apparatuses 10 and 20 are apparatuses that enable communication of RTP packets of main information between adjacent networks, and also have the RTP disconnection detection function. The RTP monitoring apparatuses 10 and 20 are generally referred to as a Session Border Controller (SBC).

The RTP monitoring apparatuses 10 and 20 have different reference numbers but are the same. The RTP monitoring apparatuses 10 and 20 may be configured integrally with separate SBCs, respectively, or may be included in the SIP servers 3 and 4.

In the following description, assume that a first timer value at which the RTP disconnection detection function of the packet transfer network 2, where the operation provider is company A, operates is T1, and a second timer value at which the RTP disconnection detection function of the packet transfer network 5, where the operation provider is company B, operates is T2. For example, T1 is a timer value such as 10 seconds, and T2 is a timer value such as 30 seconds. The RTP disconnection detection is performed by either the RTP monitoring apparatus 10 or the RTP monitoring apparatus 20. The agreement between the operation providers determines which apparatus to perform the detection. Hereinafter, an example will be described in which the RTP monitoring apparatus 10 performs the RTP disconnection detection.

Figure 2:
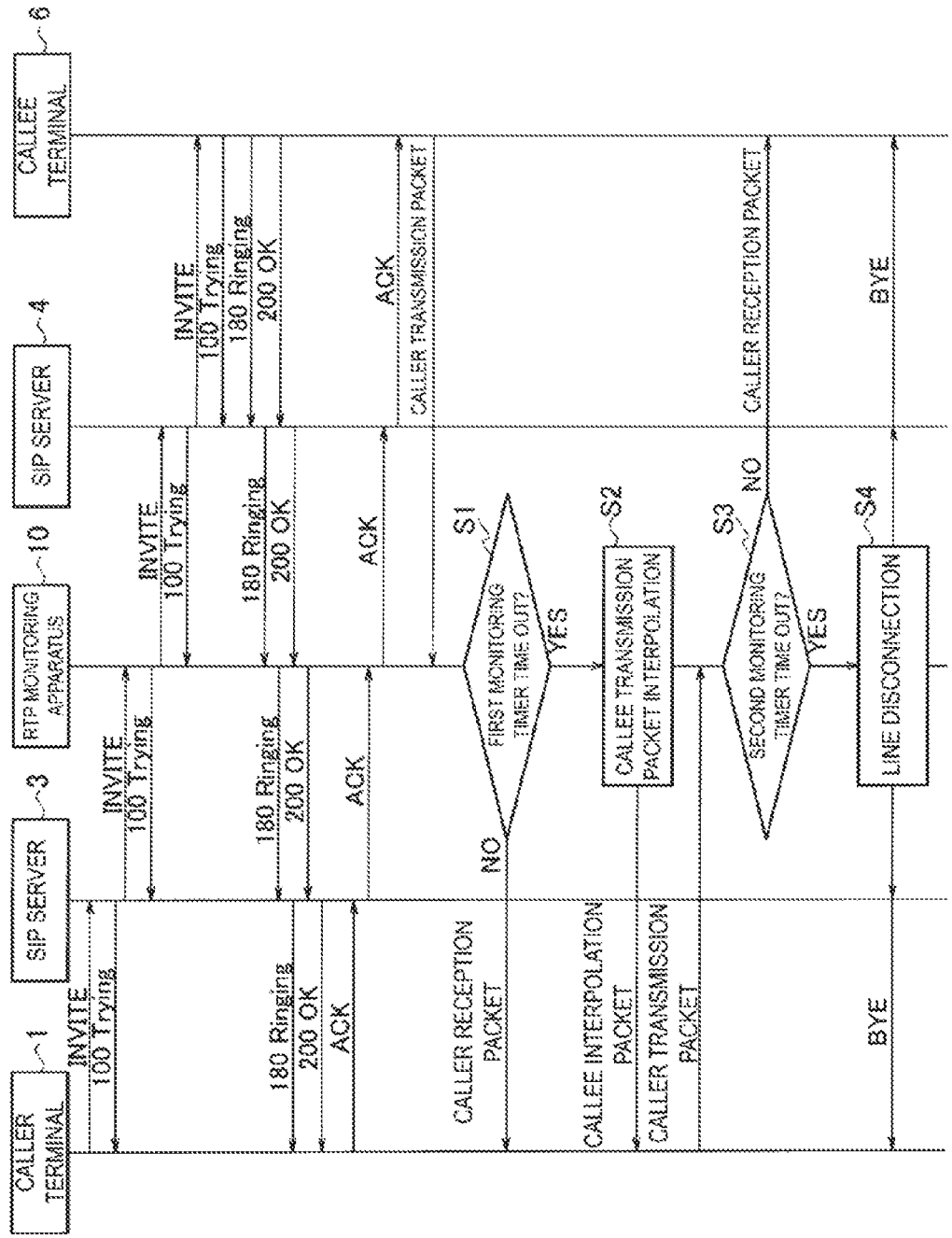
FIG. 2 is a diagram illustrating an operation sequence of the IP telephony network illustrated in FIG. 1.

FIG. 2 is an operation sequence diagram schematically illustrating an operation procedure of the IP telephony network 100. In FIG. 2, for convenience of drawing, only a callee interpolation packet that is generated when the callee transmission packet transmitted from the callee terminal 6 is interrupted for some reason is described. The caller interpolation packet generated when the caller transmission packet transmitted from the caller terminal 1 is interrupted will be described later.

The telephone numbers and IP addresses of the caller terminal 1 and the callee terminal 6 are registered in the SIP servers 3 and 4 in advance. Alternatively, the telephone numbers and the IP addresses may be transmitted to the SIP servers 3 and 4 when each receiver is picked up for the first time.

When communication is started between the caller terminal 1 and the callee terminal 6, for example, the telephone number of the callee terminal 6 is dialed from the caller terminal 1. At this time, an INVITE message is transmitted from the caller terminal 1 to the SIP server 3, and the SIP server 3 returns a provisional response of 100 Trying to the caller terminal 1.

The INVITE message and the provisional response of 100 Trying are sequentially repeated between the SIP server 3 and the RTP monitoring apparatus 10, between the RTP monitoring apparatus 10 and the SIP server 4, and between the SIP server 4 and the callee terminal 6.

When the callee terminal 6 receives the INVITE message, the callee terminal 6 transmits a provisional response of 180 Ringing to the caller terminal 1 (180 Ringing). While the caller terminal 1 receives the 180 Ringing, a ringtone sounds from the caller terminal 1.

When the receiver of the callee terminal 6 is picked up, the callee terminal 6 transmits a success response of 200 OK to the caller terminal 1 (200 OK).

When the 200 OK is received, the caller terminal 1 knows the IP address of the callee terminal 6, and thereby transmits the ACK message directly to the callee terminal 6. The transmission of the ACK message means that a line is established (session establishment) between the caller terminal 1 and the callee terminal 6. After the line is established, a voice packet that is the main information is transmitted between the caller terminal 1 and the callee terminal 6 using the RTP. While the line is established, the SIP server 3, the RTP monitoring apparatus 10, and the SIP server 4 monitor the circulation of the RTP packets in the packet transfer networks 2 and 5, respectively.

The callee transmission packet (voice packet) transmitted from the callee terminal 6 to the caller terminal 1 is transmitted to the caller terminal 1 (NO in step S1). It is assumed that a first monitoring timer (not illustrated) for counting the first timer value T1 provided in the RTP monitoring apparatus 10 is reset each time a callee transmission packet is circulated in the packet transfer network 2. The first timer value T1 is a timer value for counting the time during which the RTP disconnection detection function in the packet transfer network 2 operates.

It is assumed that a case in which the circulation of the callee transmission packet in the packet transfer network 2 is interrupted for some reason. In this case, in the related art, the SIP server 3 detects the disconnection of a line based on the first timer value T1, and transmits a BYE message meaning the disconnection of the line to the caller terminal 1 and the callee terminal 6, thereafter the communication between the two terminals ends.

In the RTP monitoring apparatus 10 according to the present embodiment, a callee interpolation packet that interpolates the interrupted callee transmission packet is generated for a predetermined time after the first monitoring timer times out. Then, the generated callee interpolation packet is transmitted to the SIP server 3 and the caller terminal 1 (step S2). The transmission time of the callee interpolation packet is the time from when the first monitoring timer times out (YES in step S1) to when the second monitoring timer (second timer value T2) times out (YES in step S3).

In this example, T1 is 10 seconds and T2 is 30 seconds, and thus the callee interpolation packet is transmitted to the SIP server 3 and the caller terminal 1 for 10 to 30 seconds. Thereby, the corresponding line of the packet transfer network 2 is not disconnected during that time. In other words, the callee interpolation packet is circulated in the packet transfer network 2 having a short timer value so that the disconnection of the line by the RTP disconnection detection function of the packet transfer network 2 is suppressed.

In other words, the RTP monitoring apparatus 10 according to the present embodiment sets the timer values of the caller network and the callee network in advance, and generates an interpolation packet (for example, the callee interpolation packet) only for the time of the difference between the timer values. As a result, the line can be disconnected based on the larger side timer value.

Although the description has been made of an example in which the first timer value T1 is smaller than the second timer value T2, the present disclosure is not limited to this example. The first timer value T1 may be larger than the second timer value T2.

The case where the first timer value T1 is larger than the second timer value T2, and the operation of monitoring the caller transmission packet transmitted from the caller terminal 1 to the callee terminal 6, will be described in the following description of the RTP monitoring apparatus.

RTP Monitoring Apparatus

Figure 3:
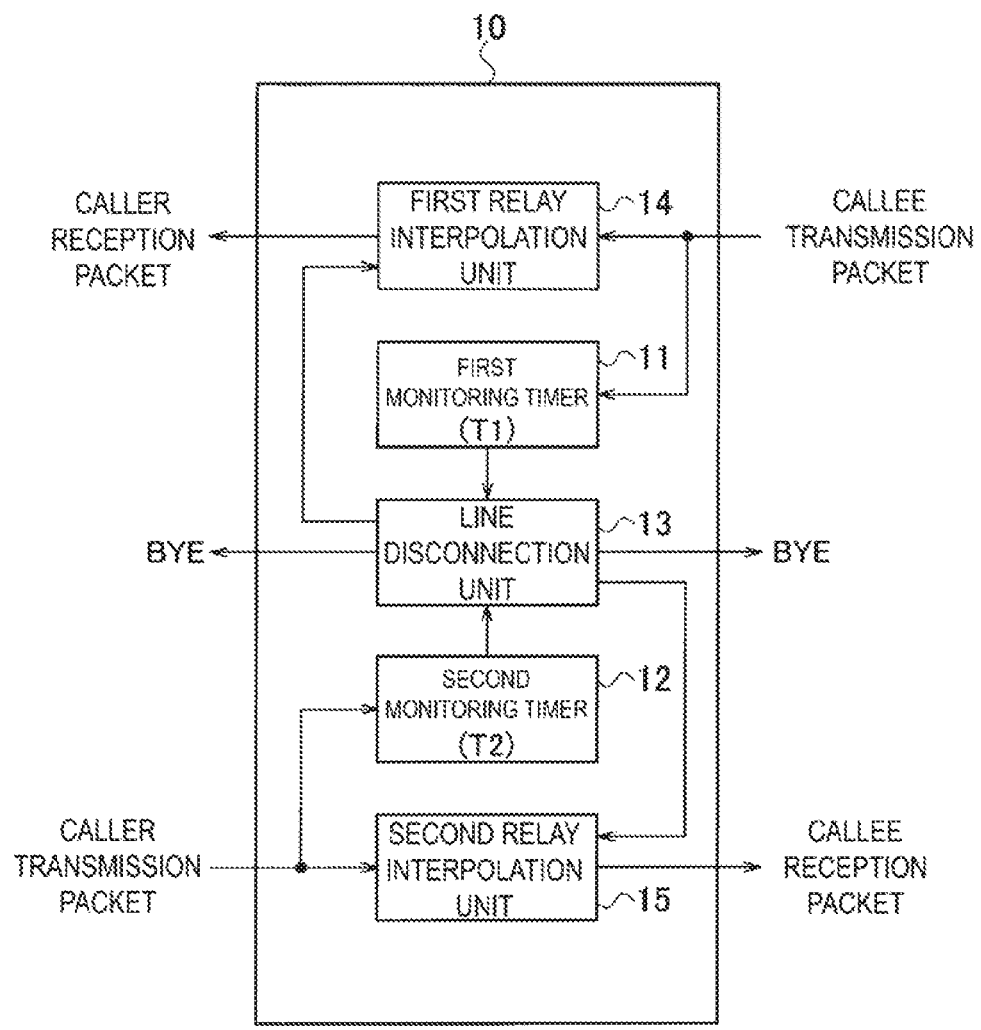
FIG. 3 is a block diagram illustrating a configuration example of a function of the RTP monitoring apparatus illustrated in FIG. 1.

FIG. 3 is a block diagram illustrating a functional configuration example of the RTP monitoring apparatus 10. In FIG. 3, notations such as a communication interface unit, a control unit, and an SIP message analysis unit, which are general configurations, are omitted.

As illustrated in FIG. 3, the RTP monitoring apparatus 10 includes a first monitoring timer 11, a second monitoring timer 12, a line disconnection unit 13, a first relay interpolation unit 14, and a second relay interpolation unit 15. Each functional configuration unit of the RTP monitoring apparatus 10 is realized by, for example, a computer including a ROM, a RAM, a CPU, and the like. When each functional configuration unit is realized by the computer, the processing content of the function that each functional configuration unit should have is described by a program. Note that the line disconnection unit 13 is not an essential functional configuration unit. The reason will be described later.

Figure 4:
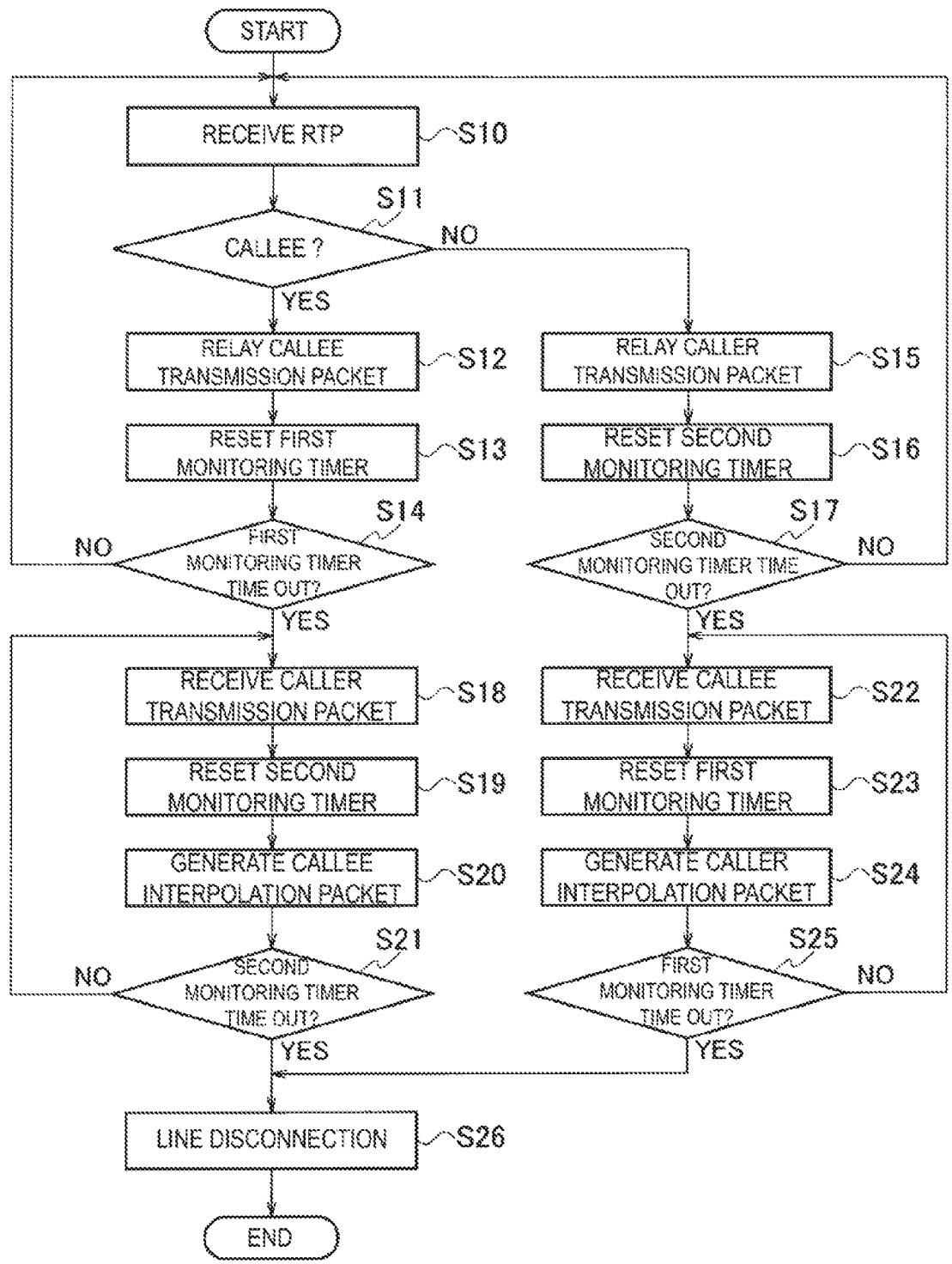
FIG. 4 is a flowchart illustrating a processing procedure of the RTP monitoring apparatus illustrated in FIG. 3.

FIG. 4 is a flowchart illustrating a processing procedure of the RTP monitoring apparatus 10. FIG. 4 illustrates a processing procedure after a line is established between the caller terminal 1 and the callee terminal 6.

Note that, for convenience of drawing, FIG. 4 is a flowchart illustrating an example in which the control unit of RTP monitoring apparatus 10 (not illustrated) allocates the callee transmission packet and the caller transmission packet, which are received from the callee terminal 6 and the caller terminal 1, respectively, to the first relay interpolation unit 14 and the second relay interpolation unit 15, respectively.

First, the monitoring operation of a voice packet transmitted from the callee terminal 6 to the caller terminal 1 will be described.

When the received voice packet is a callee transmission packet (YES in step S11), the first relay interpolation unit 14 relays the received callee transmission packet to the caller terminal 1 (step S12). In this case, the first monitoring timer 11 is reset by the received callee transmission packet (step S13). The reset of the first monitoring timer 11 is repeatedly performed each time a callee transmission packet is received.

The first monitoring timer 11 does not time out unless the callee transmission packet transmitted from the callee terminal 6 is interrupted for the first timer value T1 or more. It is assumed that a case when the callee transmission packet transmitted from the callee terminal 6 is interrupted for some reason, and the caller transmission packet transmitted from the caller terminal 1 is continuously received.

In this case, the second relay interpolation unit 15 relays the received caller transmission packet to the callee terminal 6 (step S18). Then, the second monitoring tinier 12 is reset with the received caller transmission packet (step S19). At this time, the control unit (not illustrated) causes the first relay interpolation unit 14 to generate a callee interpolation packet for interpolating the interrupted callee transmission packet, and issues an instruction of transmitting the generated callee interpolation packet to the caller terminal 1.

Thus, the interrupted callee transmission packet is interpolated by the callee interpolation packet generated by the first relay interpolation unit 14 (step S20). The generation and the interpolation of the callee interpolation packet are repeated until the counting of the second timer value T2 counted by the second monitoring timer 12 ends (NO loop in step S21). The first timer value T1 and the second timer value T2 are stored in advance in, for example, a ROM constituting the RTP monitoring apparatus 10.

When the second monitoring timer 12 ends counting the second timer value T2 after the reception of the caller transmission packet from the caller terminal 1 is interrupted (YES in step S21), the counting of the first timer value T1 already timed out, and thus the line disconnection unit 13 notifies of the disconnection of the line by transmitting a BYE message meaning disconnection of the line to each of the caller terminal 1 and the callee terminal 6 (step S26). Note that the SIP server 3 may perform the notification of the disconnection of the line. That is, the RTP disconnection detection function may be provided in the SIP servers 3 and 4, and thus the BYE message may be transmitted using the functions of the SIP servers 3 and 4. In this case, the line disconnection unit 13 of the RTP monitoring apparatus 10 is unnecessary.

The operation in the case where the callee transmission packet transmitted by the callee terminal 6 is interrupted has been described. Subsequently, the monitoring operation of the voice packet transmitted from the caller terminal 1 to the callee terminal 6 will be described.

When the received voice packet is a caller transmission packet (NO in step S11), the second relay interpolation unit 15 relays the received caller transmission packet to the callee terminal 6 (step S15). In this case, the second monitoring timer 12 is reset by the received caller transmission packet (step S16). The reset of the second monitoring timer 11 is repeatedly performed each time a caller transmission packet is received.

The second monitoring timer 12 does not time out unless the caller transmission packet transmitted from the caller terminal 1 is interrupted for the second timer value T2 or more. It is assumed that a case when the caller transmission packet transmitted from the caller terminal 1 is interrupted for some reason, and the callee transmission packet transmitted from the callee terminal 6 is continuously received.

In this case, the first relay interpolation unit 14 relays the received callee transmission packet to the caller terminal 1 (step S22). Then, the first monitoring timer 11 is reset with the received callee transmission packet (step S23). At this time, the control unit (not illustrated) causes the second relay interpolation unit 15 to generate a caller interpolation packet for interpolating the interrupted caller transmission packet, and issues an instruction of transmitting the generated caller interpolation packet to the callee terminal 6.

Thus, the interrupted caller transmission packet is interpolated by the caller interpolation packet generated by the second relay interpolation unit 15 (step S24). The generation and the interpolation of the caller interpolation packet are repeated until the counting of the first timer value T2 counted by the first monitoring timer 11 ends (NO loop in step S25).

When the first monitoring timer 11 ends counting the first timer value T1 after the reception of the caller transmission packet from the caller terminal 1 is interrupted (YES in step S25), the counting of the second timer value T2 already timed out, and thus the line disconnection unit 13 notifies of the disconnection of the line by transmitting a BYE message meaning disconnection of the line to each of the caller terminal 1 and the callee terminal 6 (step S26).

As described above, the RTP monitoring apparatus 10 according to the present embodiment includes the first monitoring timer 11, the second monitoring timer 12, the first relay interpolation unit 14, the second relay interpolation unit 15, and the line disconnection unit 13. The first monitoring timer 11 counts the first tinier value T1 representing a predetermined time from when the callee transmission packet transmitted from the callee terminal 6 is interrupted. The second monitoring timer 12 counts the second timer value T2 representing a predetermined time from when the caller transmission packet transmitted from the caller terminal 1 is interrupted. The first relay interpolation unit 14 relays the callee transmission packet to the caller terminal 1, and while the first monitoring timer 11 times out and the second monitoring timer 12 performs counting, generates a callee interpolation packet for interpolating the callee transmission packet and transmits the generated packet to the caller terminal 1.

The second relay interpolation unit 15 relays the caller transmission packet to the callee terminal 6, and while the second monitoring timer 12 times out and the first monitoring timer 11 performs counting, generates a caller interpolation packet for interpolating the caller transmission packet and transmits the generated packet to the callee terminal 6.

The line disconnection unit 13 notifies, when the first monitoring timer 11 and the second monitoring timer 12 time out, both the caller terminal 1 and the callee terminal 6 of the disconnection of the line.

Thereby, the interpolation packet (caller interpolation packet, callee interpolation packet) is transmitted and interpolated toward a network (packet transfer network) having a short timer value, and the operation of the RTP disconnection detection function of the network with a small timer value is suppressed, and the RTP disconnection detection function of the network with a large timer value operates.

As described above, according to the RTP monitoring apparatus 10 and the monitoring method of the present embodiment, the RTP disconnection detection function can be appropriately operated even when networks having different timer values are connected. That is, the RTP disconnection detection function can be continuously used between all the operation providers while maintaining the policy of each network without affecting existing facilities and devices.

As described with reference to FIG. 4, the counting processing of the first monitoring timer 11 and the second monitoring timer 12 are each performed independently. Accordingly, regarding the magnitudes of the first timer value T1 and the second timer value T2, the first timer value T1 may be smaller than the second timer value T2, or the first timer value T1 may be larger than the second timer value T2.

In addition, the callee interpolation packet and the caller interpolation packet generated by the first relay interpolation unit 14 and the second relay interpolation unit 15 are, for example, silent packets if they are voice packets. When the silent packets are transmitted for several tens of seconds, a user may be concerned that an unexplained breakdown has occurred.

Thus, the callee interpolation packet and the caller interpolation packet may each have a meaning. For example, the callee interpolation packet and the caller interpolation packet may be used for transmitting voice guidance such as "communication is unstable". Note that information such as "communication is unstable" may be transmitted as text information.

That is, the first relay interpolation unit 14 puts, on the callee interpolation packet, information indicative of a packet for interpolating the callee transmission packet, and transmits the callee transmission packet to the caller terminal 1, and the second relay interpolation unit 15 puts, on the caller interpolation packet, information indicative of a packet for interpolating the caller transmission packet, and transmits the caller interpolation packet to the callee terminal 6. This allows the user to grasp the status and does not make the user feel uneasy.

Further, although the first timer value T1 and the second timer value T2 have been described as being stored in advance in, for example, a ROM constituting the RTP monitoring apparatus 10, the present disclosure is not limited to this example. The first timer value T1 and the second timer value T2 may be described in and an SIP message.

FIG. 5 illustrates a specific example of an SIP INVITE message. A timer value of 30 seconds is described in the bottom line in FIG. 5. As described above, for example, the first timer value T1 and the second timer value T2 may be described inside the INVITE message, and the description may be analyzed by the SIP message analysis unit (not illustrated) and stored in the RAM or the like.

Further, an example has been described in which the control unit issues an instruction to generate a callee interpolation packet and a caller interpolation packet, but the present disclosure is not limited to this example. The second relay interpolation unit 15 may refer to a state of the line disconnection unit 13 (a control line (FIG. 3) connecting the line disconnection unit 13 and the second relay interpolation unit 15) and generate the callee interpolation packet in response to the state. In this case, the second relay interpolation unit 15 generates the callee interpolation packet while the first monitoring timer 11 times out and the second monitoring timer 12 performs counting. The same applies to the caller interpolation packet.

As described above, the present disclosure is not limited to the above embodiment, and can be modified within the scope of the disclosure.

REFERENCE SIGNS LIST

1 Caller terminal
2, 5 Packet transfer network
3, 4 SIP server
6 Callee terminal
10, 20 RTP monitoring apparatus
11 First monitoring timer
12 Second monitoring timer
13 Line disconnection unit
14 First relay interpolation unit
15 Second relay interpolation unit
T1 First timer value
T2 Second timer value

The invention claimed is:

1. A Real-time Transport Protocol (RTP) monitoring apparatus for connecting a packet transfer network, the RTP monitoring apparatus comprising:
a first monitoring timer configured to count a first timer value representing a predetermined time from when a callee transmission packet transmitted from a callee terminal is interrupted;
a second monitoring timer configured to count a second timer value representing a predetermined time from when a caller transmission packet transmitted from a caller terminal is interrupted;
a first relay interpolation unit, including one or more processors, configured to relay the callee transmission packet to the caller terminal, and while the first monitoring timer times out and the second monitoring timer performs counting, generate a callee interpolation packet for interpolating the callee transmission packet and transmit the generated callee interpolation packet to the caller terminal; and
a second relay interpolation unit, including one or more processors, configured to relay the caller transmission packet to the callee terminal, and while the second monitoring timer times out and the first monitoring timer performs counting, generate a caller interpolation packet for interpolating the caller transmission packet and transmit the generated caller interpolation packet to the callee terminal.

2. The RTP monitoring apparatus according to claim 1, further comprising:
a line disconnection unit, including one or more processors, configured to notify, when the first monitoring timer and the second monitoring timer time out, both the caller terminal and the callee terminal of disconnection of a line.

3. The RTP monitoring apparatus according to claim 1, wherein
the first relay interpolation unit puts, on the callee interpolation packet, information indicative of a packet for interpolating the callee transmission packet, and transmits the callee interpolation packet to the caller terminal, and
the second relay interpolation unit puts, on the caller interpolation packet, information indicative of a packet for interpolating the caller transmission packet, and transmits the caller interpolation packet to the callee terminal.

4. An RTP monitoring method executed by an RTP monitoring apparatus, the RTP monitoring method comprising:
counting a first timer value representing a predetermined time from when a callee transmission packet transmitted from a callee terminal is interrupted;
counting a second timer value representing a predetermined time from when a caller transmission packet transmitted from a caller terminal is interrupted;
relaying the callee transmission packet to the caller terminal, and while counting of the first timer value ends and the second timer value is counted, generating a callee interpolation packet for interpolating the callee transmission packet and transmitting the generated callee interpolation packet to the caller terminal; and
relaying the caller transmission packet to the callee terminal, and while counting of the second timer value ends and the first timer value is counted, generating a caller interpolation packet for interpolating the caller transmission packet and transmitting the generated caller interpolation packet to the callee terminal.

5. The RTP monitoring method according to claim 4, further comprising:
notifying, when the counting of the first timer value and the counting of the second timer value end, both the caller terminal and the callee terminal of disconnection of a line.

6. The RTP monitoring method according to claim 4, further comprising:
putting, on the callee interpolation packet, information indicative of a packet for interpolating the callee transmission packet, and transmitting the callee interpolation packet to the caller terminal; and
putting, on the caller interpolation packet, information indicative of a packet for interpolating the caller transmission packet, and transmitting the caller interpolation packet to the callee terminal.

* * * * *